Nov. 4, 1924.  
F. H. VAN HOUTEN  
DOUGH ELEVATOR  
Filed April 18, 1922  
1,514,185  
2 Sheets-Sheet 1
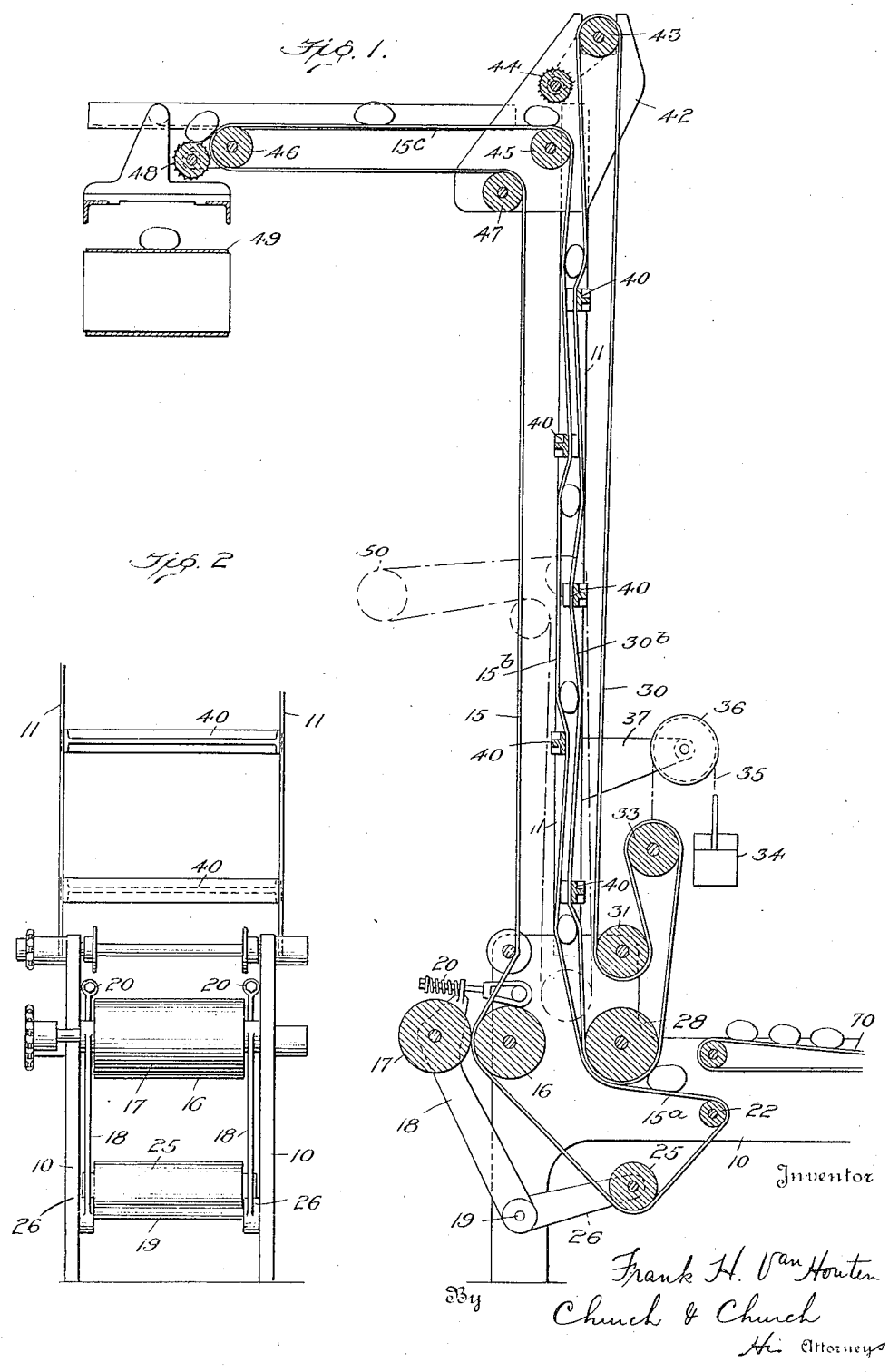

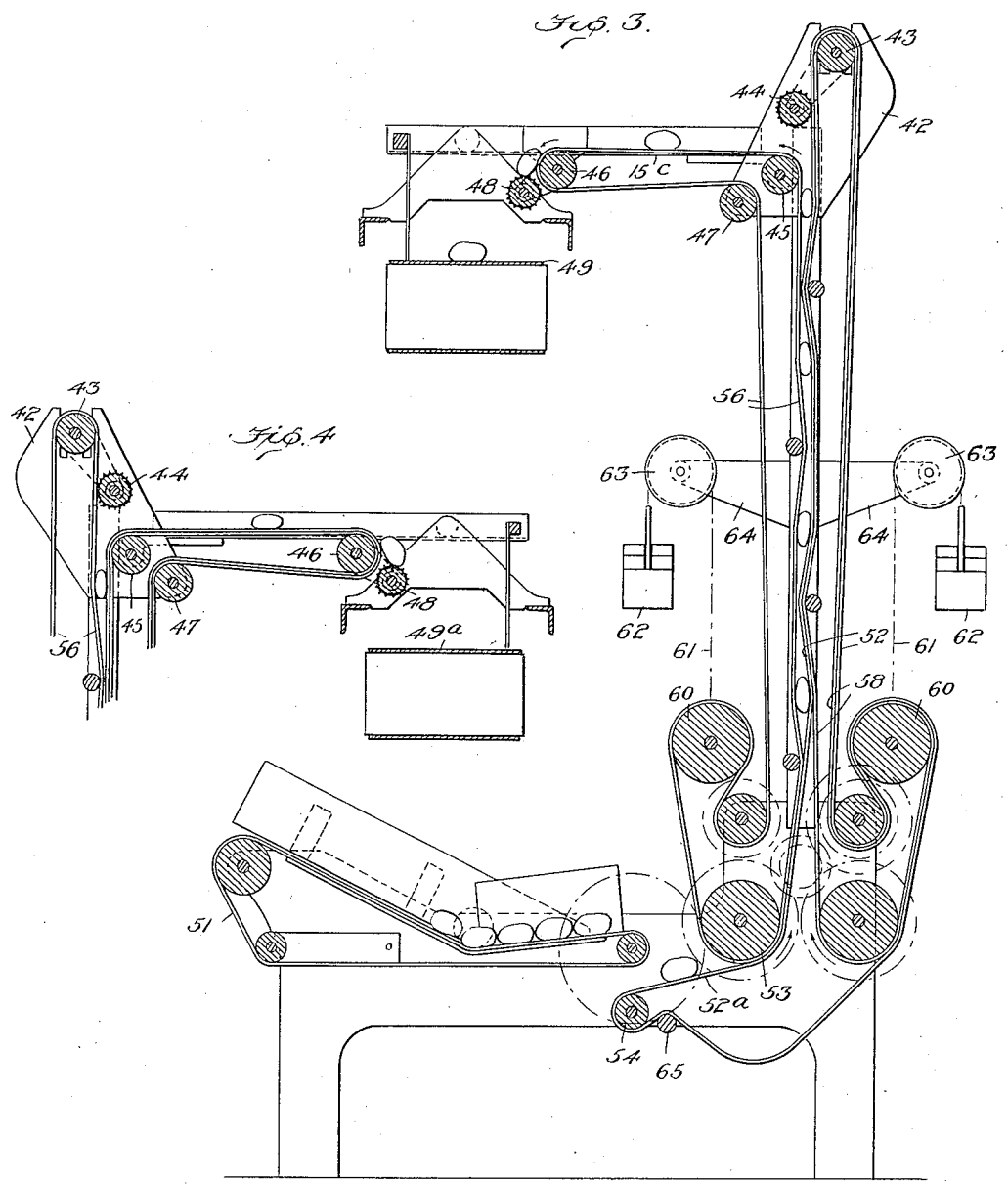

Patented Nov. 4, 1924.

1,514,185

UNITED STATES PATENT OFFICE.

FRANK H. VAN HOUTEN, OF BEACON, NEW YORK, ASSIGNOR TO DUTCHESS TOOL COMPANY, OF BEACON, NEW YORK, A CORPORATION OF NEW YORK.

DOUGH ELEVATOR.

Application filed April 18, 1922. Serial No. 555,520.

*To all whom it may concern:*

Be it known that I, FRANK H. VAN HOUTEN, a citizen of the United States, residing at Beacon, in the county of Dutchess and State of New York, have invented certain new and useful Improvements in Dough Elevators; and I do hereby declare the following to be a full, clear, and exact description of the same, reference being had to the accompanying drawings, forming part of this specification.

This invention relates to dough elevators and particularly to an elevator composed of a plurality of endless belts intended to receive lumps of dough from a spacing machine at a lower level and to transfer them to the top of the proofer at a higher level. The object of the invention is to simplify and improve the construction of such elevators in order to insure against slipping of the balls of dough while in transit.

This elevator is one member of a series of mechanisms for the handling of dough in the making of bread and is located between the spacing machine and the proofer. The balls of dough are dropped at equal intervals from the spacing machine and are carried by the elevator to the top reach of the belt of the proofer cabinet. It is evident that the relative positions of the balls of dough must be preserved in the elevator as otherwise the accurate spacing obtained in the spacing machine would be lost.

In the drawings,—

Figure 1 shows a side elevation of the elevator.

Fig. 2 is a rear elevation showing the gearing.

Fig. 3 is a somewhat modified structure.

Fig. 4 is a side elevation of the upper portion of the elevator shown in Fig. 3 when used for delivering dough to the right instead of to the left as shown in that figure.

The frame 10 is in the form of a table supporting the various shafts and having at one end a pair of standards 11 supporting the girts and the upper discharge mechanism. As shown in Fig. 1 the endless belt 15 is held in contact with the driving roll 16 by means of a roll 17 carried by an arm 18 pivoted to the frame as at 19 and being urged against the drive roll 16 by means of adjustable springs 20.

A bight is provided in the belt 15 between the drive roller 16 and the roll 22 which forms one end of the receiving reach 15$^a$ of the belt and in this bight is supported a weighted roll 25 mounted in arms 26 pivoted to the frame as at 19, but entirely independent of the similar arms 18. This roll 25 is of such weight as to insure that the receiving reach 15$^a$ of the belt 15 is sufficiently taut to prevent sagging when a ball of dough falls upon it, but at the same time it is light enough to prevent undue tension between the belt and the drive roll 28 which forms the lower guide for the vertical section 15$^b$ of the belt.

The second or guiding belt 30 passes over the driving roll 31 forming a loop between that roll and the drive roll 28 in which loop is positioned a tensioning roll 33 flexibly connected to a relatively heavy weight 34 by a chain or other fastening 35 passing over a sheave 36 pivoted in brackets 37 extending from the standards 11.

The belt 30 in passing over the drive roll 28 is in contact with the belt 15, the friction between the belt 30 and the drive roll 28 being provided by the weight 34 which insures that the belt shall not slip. The elevating reach 30$^b$ of the belt 30 is held substantially in contact with the cooperating reach 15$^b$ of the receiving belt by a plurality of girts 40 alternately spaced on alternate sides of the two endless belts 15 and 30 so as to hold these two belts in contact on their inner faces when no dough is being elevated.

At the top of the standards 11 are plates 42 in which is adjustably mounted a drive roll 43 which carries and guides the belt 30 and which is provided with gearing (not shown) for driving the stripping roll 44 which removes the balls of dough from the belt 30 should they show any tendency to stick to the belt. A horizontal reach 15$^c$ is formed in the belt 15 between the roller 45 and the end roller 46 and a stripping roll 48 placed just beyond the end of this horizontal reach 15$^c$ is driven at a slightly higher peripheral speed than the travel of the belt so that the dough cannot be carried between the rolls 46 and 48 even if it should be stuck to the belt.

This stripping roll 48 like the roll 44 is preferably provided with a series of ribs or corrugations running lengthwise of its surface and since each of these two rolls are driven at a slightly higher surface speed than that of the belts they have been found to be of material help in maintaining the even spacing of the dough on the proofer belt 49 since the dough is always dropped with the same force on the proofer belt and in the proper position and where any sticking to the belt 30 is present the higher speed and the ribs on the roll 44 insure its instant release without loss of position.

Power to drive the various gears is obtained through the sprocket or gear 50 from some available source, preferably from the line shaft of the proofer so that the elevator always runs when the proofer is in operation. While the girts 40 are shown as rigid bars bolted at their ends to the uprights of the elevator frame it should be apparent that they may be made in the form of rollers running on shafts fastened to these uprights if so desired.

In the modification shown in Fig. 3 the belt 51 delivers the dough to the slightly inclined receiving reach 52$^a$ between the drive roll 53 and the stationary roll 54. There are three belts in the modification shown in this figure; the receiving belt 52, the guiding belt 56, and the auxiliary belt 58.

The means for making the belts 56 and 58 taut is similar to the mechanism shown in connection with belt 30 of the preferred type consisting in each case of an idler roll 60 in a bight of the belt and connected by a chain or other flexible means 61 with a weight 62, the chains passing over sheaves 63 carried by a bracket 64 extending beyond each side of the standards. The receiving belt 52 is held in proper position by the friction against the roll 54 and the stationary girts 65 as it passes over and around these girts just before passing to the drive roll 53.

At its upper portion the mechanism of the belt is substantially identical with that shown in the preferred form and the parts are given similar numerals accordingly.

In Fig. 4 a slight change is made in order that the belt shall deliver to the right of the elevator instead of to the left. In this figure the top belt of the proofer is noted as 49$^a$ and the guide rolls 45 and 47 are on the opposite side of the guiding belt 56 since the plates 42 are reversed. The structure shown in this figure except for the reversal of parts is identical with the preferred form as will be evident from an inspection of the two figures.

The operation of the device is believed to be apparent. The balls of dough are delivered to the receiving reach 15$^a$ by means of a conveyor 70 which may be a part of the spacing machine. The balls of dough are caught between the belts 15 and 30, are slightly flattened as they pass beneath the drive roll 28 and form pockets between the two belts as they pass between the drive roll 28 and the lowest girt and also between adjacent girts.

The tension of the belts is sufficiently light to permit the balls of dough to pass the girts without undue deformation but is sufficiently heavy to insure against any slipping of the balls of dough under the force of gravity. As the balls pass the highest girt 40 they will in general follow the belt 15 and if they should not they are instantly dislodged by the more rapidly moving ribbed stripping roll 44 and are delivered to the horizontal reach 15$^c$. As they pass from the roll 46 they are invariably stripped from the belt 15 by the roll 48 and delivered with definite force to the top belt 49 of the proofer accurately spaced so as to prevent piling in the proofer.

What I claim is:

1. In a dough elevator, an endless belt having a receiving reach and an elevating reach, a cooperating endless belt having an elevating reach substantially in contact with the elevating reach of the first mentioned belt when the elevator is empty, spaced girts positioned alternately on opposite sides of said elevating reaches, gravity controlled means for one of said endless belts for exerting a uniform tension thereon, and a weighted roll supported by a bight in the receiving belt in proximity to the receiving reach of said belt to hold said reach taut.

2. In a dough elevator embodying a plurality of cooperating endless belts, a tension device consisting of a frame, a drive roll pivoted therein, a guide roll, an endless belt surrounding said drive roll and said guide roll and providing a bight between the same, a weighted roller resting on the inner surface of said endless belt within said bight, a plurality of arms pivoted to said frame, a pressure roll carried by the free end of said arms, and adjustable means for increasing or decreasing at will the pressure between said last mentioned roll and said drive roll.

3. In a dough elevator, a plurality of belts each having an elevating reach and one of said belts having in addition a horizontal discharge reach, a stripping roll located in proximity to the elevating reach of one of said belts and above the discharge reach of the other of said belts, and means for driving said stripping roll at a surface speed greater than the surface speed of either of said belts.

4. In a dough conveyor, an endless belt, a plurality of guide rolls therefor one of said guide rolls forming the end of a discharge reach of said belt, a stripping roll located beyond said discharge reach and slightly below the level thereof, and means for driving said stripping roll at a surface speed greater than the surface speed of said belt so that a ball of dough will be stripped from the belt and delivered with a force greater than that which the discharge belt would deliver it.

5. In a dough elevator, a plurality of endless belts each having an elevating reach, a plurality of alternately spaced girts for holding said elevating reaches in contact with one another, a roll forming a receiving reach for one of said belts, independent tensioning means for each of said belts, a plurality of guide rolls for providing a discharge reach at the top of said elevator, a top roll for guiding one of said endless belts parallel to the elevating reach, a corrugated stripping roll above said discharge reach and in proximity to the elevating reach of the other of said belts, and a second stripping roller located beyond said discharge reach and slightly below the level of same, each of said stripping rolls being driven at a surface speed greater than that of the belts.

FRANK H. VAN HOUTEN.